US012671859B2

(12) United States Patent
Ouyang et al.

(10) Patent No.: US 12,671,859 B2
(45) Date of Patent: Jun. 30, 2026

(54) VIDEO PROCESSING METHOD AND APPARATUS, AND DEVICE AND STORAGE MEDIUM

(71) Applicant: Beijing Zitiao Network Technology Co., Ltd., Beijing (CN)

(72) Inventors: Haibing Ouyang, Beijing (CN); Tianzhu Ren, Beijing (CN); Yuanming Zhang, Beijing (CN); Jiaju Xu, Beijing (CN); Xingyun Li, Beijing (CN); Shouyao Wang, Beijing (CN); Meini Lin, Beijing (CN); Hao Xu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 179 days.

(21) Appl. No.: 18/570,425

(22) PCT Filed: Aug. 5, 2022

(86) PCT No.: PCT/CN2022/110514
§ 371 (c)(1),
(2) Date: Dec. 14, 2023

(87) PCT Pub. No.: WO2023/016364
PCT Pub. Date: Feb. 16, 2023

(65) Prior Publication Data
US 2024/0357196 A1 Oct. 24, 2024

(30) Foreign Application Priority Data
Aug. 12, 2021 (CN) .......................... 202110925463.9

(51) Int. Cl.
*H04N 21/431* (2011.01)

(52) U.S. Cl.
CPC .............................. *H04N 21/4318* (2013.01)

(58) Field of Classification Search
CPC ................................................ H04N 21/4318
See application file for complete search history.

(56) References Cited

U.S. PATENT DOCUMENTS

2012/0284625 A1 11/2012 Kalish et al.

FOREIGN PATENT DOCUMENTS

CN 110139159 A 8/2019
CN 110856038 A 2/2020
(Continued)

OTHER PUBLICATIONS

International Search Report in PCT/CN2022/110514, mailed Sep. 29, 2022, 4 pages.
(Continued)

*Primary Examiner* — Mishawn N. Hunter
(74) *Attorney, Agent, or Firm* — Astute IP Law Group

(57) ABSTRACT

A video processing method, apparatus, and device, and a storage medium are provided. The method includes: firstly, determining a target video template, the target video template including a correspondence between a video editing track and a field having a tag; then, obtaining a material to be filled, the material to be filled including data to be filled having a tag; and further, performing matching between the tag of the data to be filled and the tag of the field in the target video template, and filling the data to be filled corresponding to a successfully matched tag into the field having the tag in the target video template to obtain a first video.

20 Claims, 3 Drawing Sheets

Determining a target video template, the target video template including a correspondence between a video editing track and a field having a tag — S101

Obtaining a material to be filled, the material to be filled including data to be filled having a tag — S102

Performing matching between the tag of the data to be filled and the tag of the field in the target video template, and filling the data to be filled corresponding to a successfully matched tag into the field having the successfully matched tag in the target video template to obtain a first video — S103

(56)                    References Cited

FOREIGN PATENT DOCUMENTS

| CN | 111432289 | A |   | 7/2020 | | |
|----|-----------|---|---|--------|--|--|
| CN | 111833099 | A |   | 10/2020 | | |
| CN | 111930994 | A |   | 11/2020 | | |
| CN | 112016879 | A |   | 12/2020 | | |
| CN | 112312189 | A |   | 2/2021 | | |
| CN | 112637675 | A |   | 4/2021 | | |
| WO | 2010126224 | A2 |   | 11/2010 | | |
| WO | WO-2012177937 | A2 | * | 12/2012 | ............. | G06Q 50/20 |
| WO | WO-2019042341 | A1 | * | 3/2019 | ............. | G11B 27/02 |

OTHER PUBLICATIONS

Office Action received for Chinese Patent Application No. 202110925463.9, mailed on Jan. 22, 2025, 13 pages (7 pages of English Translation and 6 pages of Original Document).

\* cited by examiner

Determining a target video template, the target video template including a correspondence between a video editing track and a field having a tag ⟋ S101

Obtaining a material to be filled, the material to be filled including data to be filled having a tag ⟋ S102

Performing matching between the tag of the data to be filled and the tag of the field in the target video template, and filling the data to be filled corresponding to a successfully matched tag into the field having the successfully matched tag in the target video template to obtain a first video ⟋ S103

FIG. 1

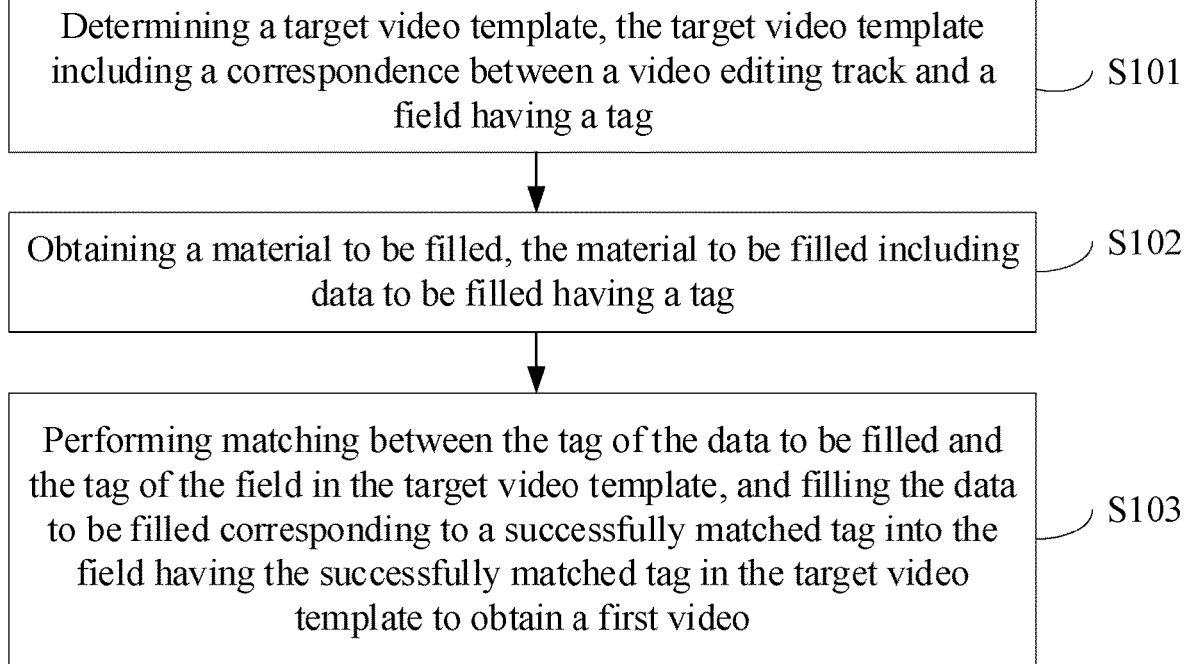

| Video track | Video1 | Video2 |
| --- | --- | --- |
| First text track | Job title    Salary range | |
| Second text track | City    Job description | |
| Third text track | | Job requirement |

FIG. 2

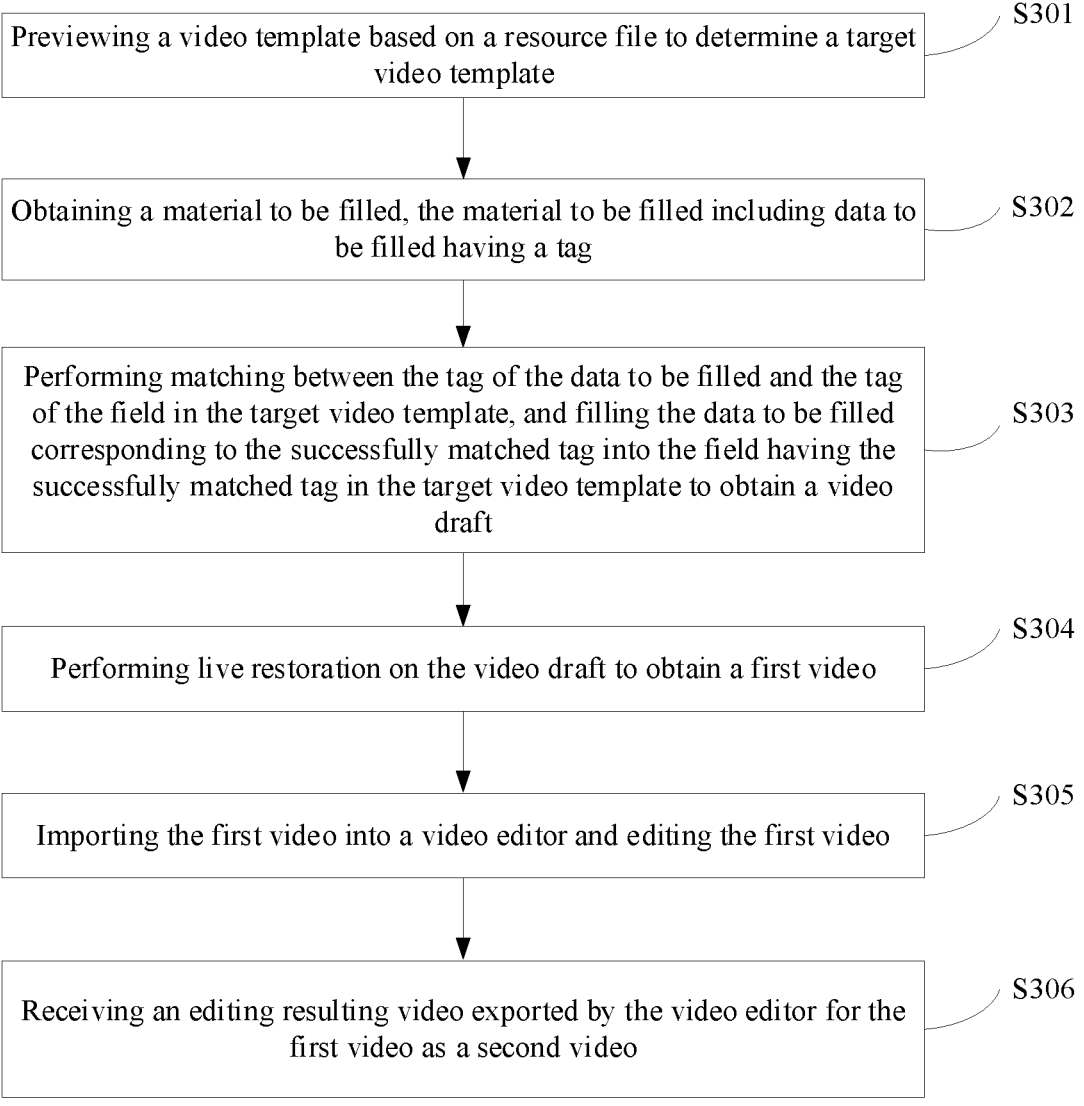

Previewing a video template based on a resource file to determine a target video template                                      S301

Obtaining a material to be filled, the material to be filled including data to be filled having a tag                                      S302

Performing matching between the tag of the data to be filled and the tag of the field in the target video template, and filling the data to be filled corresponding to the successfully matched tag into the field having the successfully matched tag in the target video template to obtain a video draft                                      S303

Performing live restoration on the video draft to obtain a first video                                      S304

Importing the first video into a video editor and editing the first video                                      S305

Receiving an editing resulting video exported by the video editor for the first video as a second video                                      S306

FIG. 3

VIDEO PROCESSING METHOD AND APPARATUS, AND DEVICE AND STORAGE MEDIUM

CROSS-REFERENCE TO RELATED APPLICATION

This is a national stage application based on International Patent Application No. PCT/CN2022/110514, filed Aug. 5, 2022, which claims priority to Chinese Patent Application No. 202110925463.9, filed on Aug. 12, 2021 and titled "video processing method, apparatus, and device, and storage medium", the disclosures of which are incorporated herein by reference in their entireties.

TECHNICAL FIELD

The present disclosure relates to the field of data processing, and in particular, to a video processing method, apparatus, and device, and a storage medium.

BACKGROUND

With the increasingly fast development of multimedia technology applications, people have increasingly more needs on multimedia information. Monotonous text presentation is increasingly unsatisfactory for people's needs. Therefore, how to enrich the ways of displaying data to enhance the sensory experience of a user is a technical problem that needs to be solved urgently.

SUMMARY

In order to solve or at least partially solve the above technical problems, the present disclosure provides a video processing method, which can fill the data to be filled into the target video template based on a matching relationship between the tag of the data to be filled and the tag of the field in the target video template to obtain the target video, thus enriching the display mode of the data, thereby improving the user experience.

In a first aspect, the present disclosure provides a video processing method, and the method comprises:

determining a target video template, where the target video template comprises a correspondence between a video editing track and a field having a tag;

obtaining a material to be filled, where the material to be filled comprises data to be filled having a tag; and performing matching between the tag of the data to be filled and the tag of the field in the target video template, and filling the data to be filled corresponding to a successfully matched tag into the field having the tag in the target video template to obtain a first video.

In an alternative implementation, after the filling the data to be filled corresponding to a successfully matched tag into the field having the tag in the target video template to obtain a first video, the method further comprises:

importing the first video into a video editor, where the video editor is configured to edit the first video; and receiving an editing resulting video exported by the video editor for the first video as a second video.

In an alternative implementation, before the determining a target video template, the method further comprises:

receiving the correspondence between the video editing track and the field having the tag based on a video editor; and generating a video template based on the correspondence between the video editing track and the field having the tag; and correspondingly, the determining a target video template comprises:

determining the target video template based on the video template.

In an alternative implementation, the filling the data to be filled corresponding to a successfully matched tag into the field having the tag in the target video template to obtain a first video comprises:

filling the data to be filled corresponding to the successfully matched tag into the field having the tag in the target video template to obtain a video draft; and performing live restoration on the video draft to obtain the first video.

In an alternative implementation, the target video template further comprises a resource file, the resource file comprises at least one of a video, a picture, and an audio; and before the determining a target video template, the method further comprises:

previewing the target video template based on the resource file.

In an alternative implementation, the data to be filled comprises job description information, and the first video is a recruitment video.

In a second aspect, the present disclosure provides a video processing apparatus, and the apparatus comprises:

a determination module, configured to determine a target video template, where the target video template comprises a correspondence between a video editing track and a field having a tag;

an obtaining module, configured to obtain a material to be filled, where the material to be filled comprises data to be filled having a tag; and a filling module, configured to perform matching between the tag of the data to be filled and the tag of the field in the target video template, and fill the data to be filled corresponding to a successfully matched tag into the field having the tag in the target video template to obtain a first video.

In a third aspect, the present disclosure provides a computer-readable storage medium, the computer-readable storage medium stores instructions, when the instructions are run on a terminal device, the terminal device is caused to implement the above-mentioned method.

In a fourth aspect, the present disclosure provides a device, comprising a memory, a processor, and a computer program stored on the memory and executable on the processor, and the processor is configured to, when executing the computer program, implement the above-mentioned method.

In a fifth aspect, the present disclosure provides a computer program product, the computer program product comprises a computer program/instruction, and when the computer program/instruction is executed by a processor, the above-mentioned method is implemented.

Compared with the prior art, the technical solution provided by the embodiments of the present disclosure has the following advantages:

the present disclosure provides a video processing method, firstly, a target video template is determined, and the target video template comprises a correspondence between a video editing track and a field having a tag; then, a material to be filled is obtained, and the material to be filled comprises data to be filled having a tag; further, the matching is performed between the tag of the data to be filled and the tag of the field in the target video template, and the data to be filled corresponding to a successfully matched tag is filled into the field having the successfully matched tag in the target video template to obtain a first video. It can be seen that the embodiments of the present disclosure can fill the data to be filled into the target video template based on the matching relationship between the tag of the data to be filled and the tag of the field in the target video template, so as to obtain the target video, which enriches the display mode of the data, thereby improving the user experience.

BRIEF DESCRIPTION OF THE DRAWINGS

The accompanying drawings herein are incorporated into and constitute a part of the specification, show the embodiments consistent with the present disclosure, and together with the description, serve to explain the principles of the present disclosure.

In order to more clearly illustrate the technical solutions of the embodiments of the present disclosure or the prior art, the drawings required for describing the embodiments or the prior art will be briefly described in the following; it is obvious that those skilled in the art can obtain other drawing (s) according to these drawings, without any inventive work.

FIG. 1 is a flowchart of a video processing method provided in an embodiment of the present disclosure;

FIG. 2 is a schematic diagram of a video editing track provided in an embodiment of the present disclosure;

FIG. 3 is a flowchart of another video processing method provided in an embodiment of the present disclosure;

DETAILED DESCRIPTION

Figure 4:
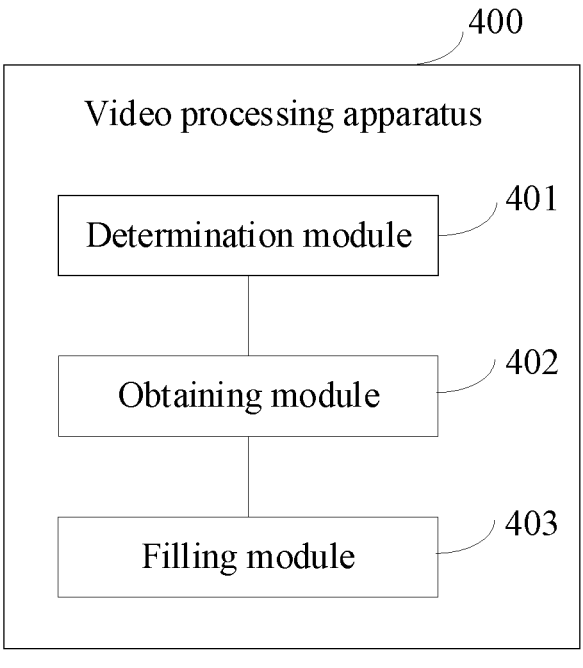
FIG. 4 is a structural schematic diagram of a video processing apparatus provided in an embodiment of the present disclosure.

In order to understand the above objects, features, and advantages of the present disclosure more clearly, the technical solutions of the present disclosure will be further described below. It should be noted that, in case of no conflict, the embodiments of the present disclosure and the features in the embodiments can be combined with each other.

In the following description, many specific details are set forth in order to fully understand the present disclosure, but the present disclosure may be implemented in other ways than those described herein; apparently, the embodiments in the specification are just a part but not all of the embodiments of the present disclosure.

With the increasingly fast development of multimedia technology applications, people have increasingly more needs on multimedia information. Monotonous text presentation is increasingly unsatisfactory for people's needs. For example, Job Description (JD for short) about a recruitment job posted on a job-hunting website is generally shown on the job-hunting website in text or a picture generated based on text as an information carrier, leading to monotonous and blunt JD showing effect and low sensory experience of a user.

Therefore, how to enrich the ways of displaying data to enhance the sensory experience of a user is a technical problem that needs to be solved urgently.

For this purpose, an embodiment of the present disclosure provides a video processing method, firstly, a target video template is determined, and the target video template comprises a correspondence between a video editing track and a field having a tag; then, a material to be filled is obtained, and the material to be filled comprises data to be filled having a tag; further, the matching is performed between the tag of the data to be filled and the tag of the field in the target video template, and the data to be filled corresponding to the successfully matched tag is filled into the field having the successfully matched tag in the target video template to obtain the first video. Thus it can be seen that the embodiments of the present disclosure can fill the data to be filled into the target video template based on the matching relationship between the tag of the data to be filled and the tag of the field in the target video template, so as to obtain the target video, which enriches the display mode of the data, thereby improving the user experience.

On this basis, an embodiment of the present disclosure provides a video processing method. With reference to FIG. 1, which is a flowchart of a video processing method provided in an embodiment of the present disclosure, the video processing method includes the following steps.

S101: determining a target video template.

The target video template includes a correspondence between a video editing track and a field having a tag.

In an embodiment of the present disclosure, the video editing track may include a video track, a text track, an audio track, a sticker track, etc. One target video template may include a plurality of video editing tracks, and the plurality of video editing tracks included in the same target video template are based on the same time axis. For example, the target video template may include one video track and three text tracks; alternatively, the target video template may include one video track, two text tracks, and one audio track; and so on.

There is a correspondence between the video editing track and the field having the tag in the target video template. Fields are arranged on the video editing track and used to characterize positions corresponding to materials that need to be added. Each field has a corresponding tag, for example, a tag of a field on the video track may be "video"; a tag of a field on the text track may be "text"; a tag of a field on the audio track may be "music"; and so on. One video editing track may include one or more fields each having a tag. When the same video editing track includes a plurality of fields having tags, the plurality of fields cannot overlap with each other on the video editing track. For example, a related material corresponding to a first field may be displayed first, which is immediately followed by displaying a related material corresponding to a second field; the related material corresponding to the first field and the related material corresponding to the second field may also be displayed separately at an interval of arbitrary time; and so on.

For example, as shown in FIG. 2, which is a schematic diagram of a video editing track provided in an embodiment of the present disclosure, the target video template includes one video track and three text tracks, the video track includes two video fields: a first video field having a tag "video1" and a second video field having a tag "video2"; a first text track includes two text fields: a first text field having a tag "text1" and a second text field having a tag "text2"; a second text track includes two text fields: a third text field having a tag "text3" and a fourth text field having a tag "text4"; and a third text track includes one text field: a fifth text field having a tag "text5". Taking a case that the related material expressed by the field is recruitment information as an example, the tag "text1" may be "title" (job title); the tag "text2" may be "salary" (salary range); the tag "text3" may be "city" (city); the tag "text4" may be "description" (job description); and the tag "text5" may be "requirement" (job requirement).

In an alternative implementation, before determining the target video template, firstly, the correspondence between the video editing track and the field having the tag is received based on a video editor; a video template is then generated based on the correspondence between the video editing track and the field having the tag; and further, the target video template is determined based on the generated video template.

In an embodiment of the present disclosure, based on the video editor, a user (e.g., a video template producer) may set one video editing track or a plurality of video editing tracks of different types (such as the video track, the text track, and the like), and may also set one or more fields each having a tag (such as "video1", "text1", and the like) on the corresponding video editing track, so as to establish the correspondence between the video editing track and the field having the tag. For example, a video track is set to correspond to two video fields having different tags; a text field is set to correspond to three text fields having different tags; a sticker track is set to correspond to one sticker field having a tag; and so on, and therefore, a plurality of video templates having different data structures are generated, the data structure of a video template is used to characterize the video editing track included in the video template and the correspondence between the video editing track and the field having the tag. The data structure corresponding to the video template may be in JSON format.

For example, as shown in FIG. 2, the video editing tracks set by the user include one video track and three text tracks, the video track is set to include two video fields of which corresponding tags are "video1" and "video2", respectively; and the text track is set to include a plurality of text fields of which corresponding tags are "title", "salary", "city", "description", and "requirement", respectively. Besides, the set video editing tracks may further include other tracks, such as the audio track, the sticker track, and the like. The set fields having tags may also include other tags, such as tag "picture", tag "environment", tag "address", and so on. One or more video templates are generated based on the correspondence between the video editing track and the field having the tag, the plurality of video templates correspond to different data structures, and the data structure corresponding to the video template may be in JSON format.

In an embodiment of the present disclosure, the target video template is determined based on the generated video templates. For example, when a user (e.g., a company recruitment information publisher) needs to edit a recruitment video, based on the requirement (such as the requirement for adding a certain sound effect or adding a certain background music, etc.), at least one video template meeting the requirement is selected as the target video template from a plurality of video templates recommended.

It needs to be noted that the embodiment of the present disclosure has no limitation on the specific video editor.

In an alternative implementation, the target video template further includes a resource file, and the resource file includes at least one of selected from a group comprising a video, a picture, and an audio. For example, the resource file may include a background music of the target video template, a sticker of the target video template, and the like. Based on the resource file, the video templates are previewed, and the target video template is then determined based on the preview effect of each video template.

In an embodiment of the present disclosure, the video template includes a data structure and a resource file, and the video template is previewed based on the resource file. In case of not filling data, an effect corresponding to the video template based on the data structure and the resource file is previewed. For example, when the video template is previewed, the included preview effect may be a background video A and be that text data may be added at a certain time period of the background video A; or the included preview effect may also be a background video B and be that text data may be added at a certain time period of the background video B and that a sound effect A may be shown at a certain time period of the background video B; and so on. Based on the preview of the respective video templates, the target video template is then determined based on the preview effects of the respective video templates.

According to the embodiment of the present disclosure, the video templates can be previewed based on the resource files, so that the user can rapidly determine the target video template according to the needs or preferences. The efficiency of video processing is improved and the use experience of the user is enhanced.

S102: obtaining a material to be filled.

The material to be filled includes data to be filled having a tag.

In an embodiment of the present disclosure, the material to be filled may include data to be filled such as text data, picture data, audio data, video data, and the like. The data to be filled above has a corresponding tag. For example, the material to be filled may include data to be filled such as text data having a tag "text", picture data having a tag "picture", audio data having a tag "music", and video data having a tag "video". Each piece of the data to be filled may be saved in a database as a file in JSON format.

S103: performing matching between the tag of the data to be filled and the tag of the field in the target video template, and filling the data to be filled corresponding to a successfully matched tag into the field having the successfully matched tag in the target video template to obtain a first video.

In an embodiment of the present disclosure, matching is performed between the tag corresponding to the data to be filled obtained in S102 and the tag of the field in the target video template determined in S101, and the data to be filled corresponding to the successfully matched tag is filled into the field having the successfully matched tag in the target video template.

For example, the data to be filled obtained in S102 includes job title which has the corresponding tag "title", also includes salary which has the corresponding tag "salary", also includes city which has the corresponding tag "city", also includes job description which has the corresponding tag "description", and also includes job requirement which has the corresponding tag "requirement". The tags of the fields in the target video template determined in S101 correspond to "title", "salary", "city", "text1", and "text2", respectively. The tags "title", "salary", and "city" corresponding to the data to be filled are successfully matched with tags "title", "salary", and "city" of the fields in the target video template, however the tags "description" and "requirement" corresponding to the data to be filled fail to match the tags of the fields in the target video template. Then, the data to be filled "job title" corresponding to the tag "title", the data to be filled "salary" corresponding to the tag "salary", and the data to be filled "city" corresponding to the tag "city" are filled into the fields respectively having such tags in the target video template to obtain the first video, and the first video may show the material to be filled in the form of video.

In an alternative implementation, the data to be filled corresponding to the successfully matched tag is filled into the field having the successfully matched tag in the target video template to obtain a video draft, and then the live restoration is performed on the video draft to obtain the first video.

In an embodiment of the present disclosure, for example, the file corresponding to the material to be filled may be in JSON format, and the data structure included in the target video template may also be in JSON format, the material to be filled may include data to be filled having a tag, matching is performed between the tag of the data to be filled and the tag of the field in the target video template, and the data to be filled corresponding to the successfully matched tag is filled into the field having the successfully matched tag in the target video template to obtain a video draft, and the video draft is also in JSON format. Furthermore, the live restoration is performed on the video draft in JSON format to obtain the first video, and the format of the first video may include mp4, mov, and the like.

It should be noted that the embodiment of the present disclosure has no limitation on the specific implementation of performing live restoration on the video draft, i.e., has no limitation on the specific implementation of converting a file in JSON format into a file in mp4 format. Moreover, the embodiment of the present disclosure also does not limit the specific video format of the first video.

In the video processing method provided in the embodiment of the present disclosure, firstly, the target video template is determined, and the target video template includes a correspondence between a video editing track and a field having a tag; the material to be filled is then obtained, and the material to be filled includes data to be filled having a tag; further, the matching is performed between the tag of the data to be filled and the tag of the field in the target video template, and the data to be filled corresponding to the successfully matched tag is filled into the field having the successfully matched tag in the target video template to obtain the first video. It can be seen that the embodiments of the present disclosure can fill the data to be filled into the target video template based on the matching relationship between the tag of the data to be filled and the tag of the field in the target video template, so as to obtain the target video, which enriches the display mode of the data, thereby improving the user experience.

In an alternative implementation, if the data to be filled includes job description information, the first video is a recruitment video.

In an embodiment of the present disclosure, the data to be filled may include job description information. The job description information may include but be not limited to job title, salary range, city, job description, job requirement, and the like, and the tags corresponding to the data to be filled may include "title", "salary", "city", "description", "requirement", and the like. For example, the material to be filled may include the data to be filled, such as XX job with tag "title", XX amount with tag "salary", XX city with tag "city", XX description with tag "description", and XX requirement with tag "requirement". The material to be filled may be a file in JSON format.

In an embodiment of the present disclosure, the target video template obtained based on the correspondence between the video editing track and the field having the tag related to the job description information may be a recruitment video template, and a recruitment video can be then obtained based on the recruitment video template and the data to be filled including the job description information.

According to the embodiment of the present disclosure, the recruitment video can be generated based on the data to be filled including the job description information, so that the diversity of displaying the job description (JD) information on the job-hunting website is improved, thereby enhancing the sensory experience of the user.

In an alternative implementation, after the data to be filled corresponding to the successfully matched tag is filled into the field having the successfully matched tag in the target video template to obtain the first video, the first video may be imported into a video editor, so as to edit the first video, and then an editing resulting video exported by the video editor for the first video is received as a second video.

In an embodiment of the present disclosure, the first video can be imported into the video editor and can be edited. For example, a small video is added to the video track of the first video, a sticker is added to the sticker track, a special effect is added to the special effect track, and the like. Furthermore, after the first video is edited based on the video editor, the exported editing resulting video is received. The editing resulting video is the second video.

For example, taking a case that the first video is a recruitment video as an example, the recruitment video is imported into the video editor, and a supplementary content such as a small video of company team building, an office environment picture, and company introduction information may be added to the recruitment video. After the recruitment video is edited based on the video editor, the exported editing resulting video is received, and the editing resulting video is the final recruitment video.

It needs to be noted that the embodiment of the present disclosure has no limitation on the specific video editor.

The embodiments of the present disclosure can perform secondary editing on the first video, thereby improving the flexibility of video processing and enhancing the user experience.

Based on the above embodiments, the present disclosure provides a specific application scenario of a video processing method. As shown in FIG. 3, which is a flowchart of another video processing method provided in an embodiment of the present disclosure, taking a case that the data to be filled includes job description information and the first video is a recruitment video as an example, the video processing method includes the following steps.

S301: previewing a video template based on a resource file to determine a target video template.

The video template further includes the resource file.

In an embodiment of the present disclosure, the video template is previewed based on the resource file, in case of not filling data, an effect corresponding to the video template based on the data structure and the resource file is previewed, data structures of different video templates and positions for filling the data to be filled are known, and then the target video template is determined according to the needs.

In the embodiment of the present disclosure, the resource file includes at least one of selected from a group comprising a video, a picture, and an audio. Based on the data structure corresponding to the video template, for example, a first video template includes one video track and two corresponding video fields, and the resource file included in the first video template may include a background video A, a background video B, and the like; a second video template includes one video track and two corresponding video fields, and further includes one audio track and one corresponding audio field, and the resource file included in the second video template may include a background video A, a background video C, a sound effect A, and the like; a third video template includes one video track and two corresponding video fields, and further includes one audio track and one corresponding audio field as well as one sticker track and one corresponding sticker field, and the resource file included in the third video template may include a background video B, a background video D, a sound effect B, and a sticker A, and the like; and so on. The effects corresponding to the above three video templates are previewed. If the user needs to use the background video B as the background video and also needs to add the sticker A, the third video template may be determined as the target video template by previewing the preview effects of the respective video templates.

S302: obtaining a material to be filled.

The material to be filled includes data to be filled having a tag.

In an embodiment of the present disclosure, the data to be filled includes job description information. For example, the job description information may include job title, salary range, city, job description, job requirement, and the like, to which the tags respectively corresponding may include "title", "salary", "city", "description", "requirement", and the like.

In the embodiment of the present disclosure, the material to be filled is obtained, and the material to be filled is stored in a database as a JSON format file. The material to be filled includes A job with tag "title", B salary with tag "salary", C city with tag "city", D job description with tag "description", E job requirement with tag "requirement", and the like.

S303: performing matching between the tag of the data to be filled and the tag of the field in the target video template, and filling the data to be filled corresponding to the successfully matched tag into the field having the successfully matched tag in the target video template to obtain a video draft.

In an embodiment of the present disclosure, as exemplified above, matching is performed between the tag corresponding to the data to be filled in the material to be filled obtained in S302 and the tag of the field in the target video template (e.g., the third video template) determined in S301. For example, tags "title", "salary", "city", "description", and "requirement" included in the material to be filled are successfully matched with tags "title", "salary", "city", "description", and "requirement" of the fields in the target video template, respectively. The data to be filled corresponding to the successfully matched tag is then filled into the field having the successfully matched tag in the target video template. As exemplified above, for example, the A job is filled into the field with tag "title" in the target video template, the B salary is filled into the field with tag "salary" in the target video template, the C city is filled into the field with tag "city" in the target video template, the D job description is filled into the field with tag "description" in the target video template, and the E job requirement is filled into the field with tag "requirement" in the target video template, so as to obtain a video draft, and the video draft may be in JSON format.

S304: performing live restoration on the video draft to obtain a first video.

In an embodiment of the present disclosure, the live restoration is performed on the video draft in JSON format obtained in S303, that is, the video draft in JSON format is converted into a file in a video format to obtain the first video, the first video is the recruitment video, and the format of the recruitment video may be mp4, mov, and the like.

S305: importing the first video into a video editor and editing the first video.

In an embodiment of the present disclosure, the recruitment video obtained in S304 is imported into the video editor, so that the recruitment video can be edited. For example, a supplementary content such as a small video of company team building, an office environment picture, and company introduction may be added to the recruitment video.

S306: receiving an editing resulting video exported by the video editor for the first video as a second video.

In an embodiment of the present disclosure, after the recruitment video obtained in S304 is edited by the video editor, the exported editing resulting video is received. The editing resulting video is the final recruitment video. For example, as exemplified above, the final recruitment video shows the A job, the B salary, the C city, the D job description, the E job requirement in the form of a video, and may also show a small video of company team building, an office environment picture, company introduction information, and the like.

In the video processing method provided in the embodiment of the present disclosure, firstly, the video templates are previewed based on the resource files included in the video templates, and the target video template is determined. The material to be filled is then obtained, the matching is performed between the tag of the data to be filled and the tag of the field in the target video template, and the data to be filled corresponding to the successfully matched tag is filled into the field having the successfully matched tag in the target video template to obtain the video draft; and the live restoration is performed on the video draft to obtain the first video. Further, the first video is imported into the video editor and is edited, and the editing resulting video exported by the video editor for the first video is received as the second video. It can be seen that the embodiments of the present disclosure can fill the data to be filled into the target video template based on the matching relationship between the tag of the data to be filled and the tag of the field in the target video template, so as to obtain the target video, which enriches the display mode of the data, thereby improving the user experience.

Moreover, the embodiments of the present disclosure can perform secondary editing on the target video, thereby improving the flexibility of video processing and enhancing the user experience.

Based on the same inventive concept as the above method embodiments, the present disclosure further provides a video processing apparatus 400. With reference to FIG. 4, which is a structural schematic diagram of a video processing apparatus provided in an embodiment of the present disclosure, the video processing apparatus 400 includes:

a determination module 401 configured to determine a target video template, where the target video template comprises a correspondence between a video editing track and a field having a tag;

an obtaining module 402 configured to obtain a material to be filled, where the material to be filled comprises data to be filled having a tag; and a filling module 403 configured to perform matching between the tag of the data to be filled and the tag of the field in the target video template, and fill the data to be filled corresponding to a successfully matched tag into the field having the tag in the target video template to obtain a first video.

In an alternative implementation, the apparatus further comprises:

an import module, configured to import the first video into a video editor, where the video editor is configured to edit the first video;

a first receiving module, configured to receive an editing resulting video exported by the video editor for the first video as a second video.

In an alternative implementation, the apparatus further comprises:

a second receiving module, configured to receive the correspondence between the video editing track and the field having the tag based on a video editor;

a generation module, configured to generate a video template based on the correspondence between the video editing track and the field having the tag.

Correspondingly, the determination module 401 comprises:

a determination sub-module, configured to determine the target video template based on the video template.

In an alternative implementation, the filling module 403 comprises:

a filling sub-module, configured to fill the data to be filled corresponding to the successfully matched tag into the field having the tag in the target video template to obtain a video draft; and a recovery sub-module, configured to perform live restoration on the video draft to obtain the first video.

In an alternative implementation, the target video template further comprises a resource file, the resource file comprises at least one selected form a group comprising a video, a picture, and an audio, and the apparatus further comprises:

a preview module, configured to preview the target video template based on the resource file.

In an alternative implementation, the data to be filled comprises job description information, and the first video is a recruitment video.

In the video processing apparatus provided in the embodiment of the present disclosure, firstly, the target video template is determined, and the target video template includes a correspondence between a video editing track and a field having a tag; the material to be filled is then obtained, and the material to be filled includes data to be filled having a tag; the matching is then performed between the tag of the data to be filled and the tag of the field in the target video template, and the data to be filled corresponding to the successfully matched tag is filled into the field having the successfully matched tag in the target video template to obtain the first video. It can be seen that the embodiments of the present disclosure can fill the data to be filled into the target video template based on the matching relationship between the tag of the data to be filled and the tag of the field in the target video template, so as to obtain the target video, which enriches the display mode of the data, thereby improving the user experience.

In addition to the above method and apparatus, the embodiments of the present disclosure further provide a computer-readable storage medium, the computer-readable storage medium stores instructions, when the instructions are run on a terminal device, the terminal device is caused to implement the video processing method described in the embodiment of the present disclosure.

The embodiments of the present disclosure further provide a computer program product, the computer program product comprises a computer program/instruction, and when the computer program/instruction is executed by a processor, the video processing method described in the embodiment of the present disclosure is implemented.

Figure 5:
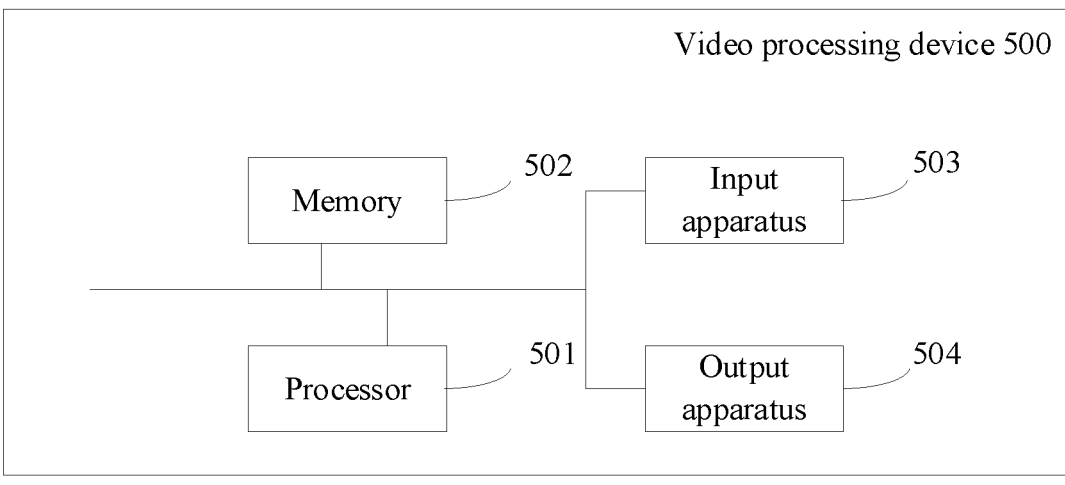
FIG. 5 is a structural schematic diagram of a video processing device provided in an embodiment of the present disclosure.

In addition, an embodiment of the present disclosure further provides a video processing device 500. As shown in FIG. 5, which is a structural schematic diagram of a video processing device provided in an embodiment of the present disclosure, the video processing device 500 may include:

a processor 501, a memory 502, an input apparatus 503, and an output apparatus 504. The number of processors 501 in the video processing device can be one or more, and one processor is taken as an example in FIG. 5. In some embodiments of the present disclosure, the processor 501, the memory 502, the input apparatus 503, and the output apparatus 504 may be connected through a bus or other means, and the connection through a bus is taken as an example in FIG. 5.

The memory 502 may be used to store software programs and modules, and the processor 501 executes various functional applications and data processing of the video processing device by running the software programs and modules stored in the memory 502. The memory 502 may mainly include a storage program area and a storage data area, the storage program area may store an operating system, an application program required by at least one function, and the like. In addition, the memory 502 may include a high-speed random-access memory, and may also include a non-volatile memory, such as at least one magnetic disk memory device, a flash memory device, or other volatile solid-state memory devices. The input apparatus 503 can be used to receive input numeric or character information and to generate signal input related to user settings and function control of the video processing device.

Specifically, in the embodiment, the processor 501 can load the executable files corresponding to the processes of one or more application programs into the memory 502 according to the following instructions, and the processor 501 can run the application programs stored in the memory 502, thus implementing various functions of the above video processing device.

It should be understood that in the specification, the relational terms such as "first", "second", etc. are only used for distinguishing one entity or operation from another entity or operation, and do not necessarily require or imply any such actual relationship or order between these entities or operations. Moreover, the term "comprise/include", "contain", and any variations thereof are intended to cover non-exclusive inclusion, such that a process, method, article, or device including a series of elements includes not only those elements, but also other elements not explicitly listed or elements inherent to such process, method, article, or device. Without further restrictions, an element defined by the phrase "comprising/including one" does not exclude the existence of other identical elements in the process, method, article, or device including the element.

What has been described above is only the specific implementation of the present disclosure, so that those skilled in the art can understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments described herein, but is to be accorded the widest scope consistent with the principles and novel features disclosed herein.

The invention claimed is:

1. A video processing method, comprising:

determining a first video template, wherein the first video template comprises a correspondence between a video editing track and a field having a tag;

obtaining a material, wherein the material comprises data having a tag; and performing matching between the tag of the data to be filled and the tag of the field in the first video template, and filling data into a field in the first video template that has a same tag as that of the data, to generate a first video.

2. The method according to claim 1, wherein after the filling data into a field in the first video template that has a same tag as that of the data, to generate a first video, the method further comprises:

importing the first video into a video editor, wherein the video editor is configured to edit the first video; and receiving an editing resulting video exported by the video editor for the first video as a second video.

3. The method according to claim 2, wherein before the determining a first video template, the method further comprises:

receiving the correspondence between the video editing track and the field having the tag based on a video editor; and generating at least one video template based on the correspondence between the video editing track and the field having the tag; and wherein the determining a first video template comprises:

determining the first video template based on the at least one video template.

4. The method according to claim 3, wherein the filling data into a field in the first video template that has a same tag as that of the data, to generate a first video comprises:

filling the data into the field in the first video template that has a same tag as that of the data, to generate a video draft; and performing live restoration on the video draft to generate the first video.

5. The method according to claim 3, wherein the first video template further comprises a resource file, the resource file comprises at least one selected from a group comprising a video, a picture, and an audio; and before the determining a first video template, the method further comprises:

previewing the first video template based on the resource file.

6. The method according to claim 2, wherein the filling data into a field in the first video template that has a same tag as that of the data, to generate a first video comprises:

filling the data into the field in the first video template that has a same tag as that of the data, to generate a video draft; and performing live restoration on the video draft to generate the first video.

7. The method according to claim 6, wherein the first video template further comprises a resource file, the resource file comprises at least one selected from a group comprising a video, a picture, and an audio; and before the determining a first video template, the method further comprises:

previewing the first video template based on the resource file.

8. The method according to claim 2, wherein the first video template further comprises a resource file, the resource file comprises at least one selected from a group comprising a video, a picture, and an audio; and before the determining a first video template, the method further comprises:

previewing the first video template based on the resource file.

9. A non-transitory computer-readable storage medium, wherein the non-transitory computer-readable storage medium stores instructions, when the instructions are run on a terminal device, the terminal device is caused to implement the method according to claim 2.

10. A device, comprising a memory, a processor, and a computer program stored on the memory and executable on the processor, wherein the processor is configured to, when executing the computer program, implement the method according to claim 2.

11. The method according to claim 1, wherein before the determining a first video template, the method further comprises:

receiving the correspondence between the video editing track and the field having the tag based on a video editor; and generating at least one video template based on the correspondence between the video editing track and the field having the tag; and wherein the determining a first video template comprises:

determining the first video template based on the at least one video template.

12. The method according to claim 11, wherein the filling data into a field in the first video template that has a same tag as that of the data, to generate a first video comprises:

filling the data into the field in the first video template that has a same tag as that of the data, to generate a video draft; and performing live restoration on the video draft to generate the first video.

13. The method according to claim 11, wherein the first video template further comprises a resource file, the resource file comprises at least one selected from a group comprising a video, a picture, and an audio; and before the determining a first video template, the method further comprises:

previewing the first video template based on the resource file.

14. The method according to claim 1, wherein the filling data into a field in the first video template that has a same tag as that of the data, to generate obtain a first video comprises:

filling the data into the field in the first video template that has a same tag as that of the data, to generate a video draft; and performing live restoration on the video draft to generate the first video.

15. The method according to claim 14, wherein the first video template further comprises a resource file, the resource file comprises at least one selected from a group comprising a video, a picture, and an audio; and before the determining a first video template, the method further comprises:

previewing the first video template based on the resource file.

16. The method according to claim 1, wherein the first video template further comprises a resource file, the resource file comprises at least one selected from a group comprising a video, a picture, and an audio; and before the determining a first video template, the method further comprises:

previewing the first video template based on the resource file.

17. The method according to claim 1, wherein the data comprises job description information, and the first video is a recruitment video.

18. A non-transitory computer-readable storage medium, wherein the non-transitory computer-readable storage medium stores instructions, when the instructions are run on a terminal device, the terminal device is caused to implement the method according to claim 1.

19. A device, comprising a memory, a processor, and a computer program stored on the memory and executable on the processor, wherein the processor is configured to, when executing the computer program, implement the method according to claim 1.

20. A video processing apparatus, comprising:

a determination module, configured to determine a first video template, wherein the first video template comprises a correspondence between a video editing track and a field having a tag;

an obtaining module, configured to obtain a material, wherein the material comprises data having a tag; and a filling module, configured to perform matching between the tag of the data and the tag of the field in the first video template, and fill data into a field in the first video template that has a same tag as that of the data, to generate a first video.

\* \* \* \* \*